(12) United States Patent
Matsumura

(10) Patent No.: US 11,077,839 B2
(45) Date of Patent: Aug. 3, 2021

(54) CONTROL SYSTEM OF VEHICLE

(71) Applicant: TOYOTA JIDOSHA KABUSHIKI KAISHA, Toyota (JP)

(72) Inventor: Mitsutaka Matsumura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 16/367,677

(22) Filed: Mar. 28, 2019

(65) Prior Publication Data
US 2019/0308603 A1   Oct. 10, 2019

(30) Foreign Application Priority Data

Apr. 10, 2018   (JP) .............................. JP2018-075765

(51) Int. Cl.
*B60W 10/08* (2006.01)
*G05D 1/00* (2006.01)

(52) U.S. Cl.
CPC ........... *B60W 10/08* (2013.01); *G05D 1/0061* (2013.01); *B60W 2510/087* (2013.01); *B60W 2710/083* (2013.01); *B60W 2710/088* (2013.01); *G05D 2201/0213* (2013.01)

(58) Field of Classification Search
CPC ........... B60W 10/08; B60W 2710/088; B60W 2710/083; B60W 2510/087; B60W 20/00; B60W 2510/107; B60W 2050/007; G05D 1/0061; G05D 2201/0213; Y02T 10/72; B60L 15/00; B60L 2240/421; B60L 2240/425; B60L 2240/485

See application file for complete search history.

(56) References Cited

U.S. PATENT DOCUMENTS

| | | | |
|---|---|---|---|
| 2003/0153428 A1* | 8/2003 | Kitano ................. | B60W 10/08 477/5 |
| 2014/0229052 A1 | 8/2014 | Takizawa et al. | |
| 2016/0131538 A1* | 5/2016 | Kobayashi .............. | G01K 7/16 374/183 |
| 2016/0209841 A1 | 7/2016 | Yamaoka et al. | |
| 2020/0317219 A1* | 10/2020 | Yoshida ................ | B60W 40/10 |

FOREIGN PATENT DOCUMENTS

| | | |
|---|---|---|
| JP | 2016-133985 A | 7/2016 |
| WO | 2013/051141 A1 | 4/2013 |

* cited by examiner

*Primary Examiner* — Peter D Nolan
*Assistant Examiner* — Ashley L Redhead, Jr.
(74) *Attorney, Agent, or Firm* — Oliff PLC

(57) ABSTRACT

A control system is installed on a vehicle having an electric motor as a drive power source. The control system includes an electronic control unit configured to switch the vehicle between an automatic driving mode using automatic drive control, and a manual driving mode in which the vehicle is operated by a driver. The electronic control unit is configured to limit the load factor of the electric motor, in the case where the temperature of the electric motor is higher than a first threshold temperature when the vehicle travels in the automatic driving mode, and the case where the temperature of the electric motor is higher than a second threshold temperature when the vehicle travels in the manual driving mode. The second threshold temperature is set to a value higher than the first threshold temperature.

9 Claims, 7 Drawing Sheets

CONTROL SYSTEM OF VEHICLE

INCORPORATION BY REFERENCE

The disclosure of Japanese Patent Application No. 2018-075765 filed on Apr. 10, 2018 including the specification, drawings and abstract is incorporated herein by reference in its entirety.

BACKGROUND

1. Technical Field

The disclosure relates to a vehicle having an electric motor as a drive power source, and particularly relates to a control system of the vehicle which limits the load factor of the electric motor.

2. Description of Related Art

A vehicle having an electric motor as a drive power source is known. One example of this type of vehicle is described in WO 2013/051141. The electric motor is connected to drive wheels via a power transmission system. The vehicle described in WO 2013/051141 has an electric motor controller that limits the load factor of the electric motor, when the temperature of the electric motor is higher than a predetermined permissible temperature, namely, a threshold temperature set in advance so as not to deteriorate the performance of the electric motor. Thus, when the temperature of the electric motor is higher than the threshold temperature, the load factor of the electric motor is limited, so that the temperature of the electric motor can be made less likely or unlikely to be raised. It is thus possible to curb deterioration of the performance of the electric motor, which would occur due to a temperature rise to a level exceeding the threshold temperature.

SUMMARY

In the meantime, a control system of a vehicle having an electric motor has been proposed which can switch the vehicle between an automatic driving mode using automatic driving control, and a manual driving mode in which the vehicle is operated by a driver. In the case where the above technology described in WO 2013/051141 is applied to this type of control system, when the temperature of the electric motor, or the temperature that varies in association with the temperature of the electric motor, becomes higher than the threshold temperature, and the vehicle is switched from the automatic driving mode to the manual driving mode, in a condition where the load factor of the electric motor is limited, for example, the electric motor is kept in the condition where the load factor is limited even after the vehicle is switched to the manual driving mode. Thus, when the driver switches the vehicle from the automatic driving mode to the manual driving mode, for example, drive torque requested by the driver may not be sufficiently generated from the electric motor if the electric motor is kept in the condition where the load factor is limited. As a result, the response of the vehicle may be reduced, and the driver may not be able to drive the vehicle as intended.

This disclosure provides a control system of a vehicle which curbs reduction of the response of the vehicle when manual driving is selected, in the case where the load factor of an electric motor is limited based on the temperature of the electric motor, or the temperature that varies in association with the temperature of the electric motor.

According to one aspect of the disclosure, a control system installed on a vehicle having an electric motor as a drive power source. The control system includes an electronic control unit configured to switch the vehicle between an automatic driving mode using automatic drive control, and a manual driving mode in which the vehicle is operated by a driver. The electronic control unit being configured to limit a load factor of the electric motor, in a case where a temperature of the electric motor is higher than a first threshold temperature when the vehicle travels in the automatic driving mode, and a case where the temperature of the electric motor is higher than a second threshold temperature when the vehicle travels in the manual driving mode. The second threshold temperature is set to a value that is higher than the first threshold temperature.

According to another aspect of the disclosure, a control system installed on a vehicle having an electric motor as a drive power source. The vehicle includes a power transmission system provided on a power transmission path between the electric motor and drive wheels. The control system includes an electronic control unit configured to switch the vehicle between an automatic driving mode using automatic drive control, and a manual driving mode in which the vehicle is operated by a driver. The electronic control unit is configured to limit a load factor of the electric motor, in a case where a hydraulic oil temperature is higher than a first threshold temperature when the vehicle travels in the automatic driving mode, and a case where the hydraulic oil temperature is higher than a second threshold temperature when the vehicle travels in the manual driving mode. The second threshold temperature is set to a value that is higher than the first threshold temperature. The hydraulic oil temperature is a temperature of hydraulic oil supplied to hydraulically operated parts and lubrication regions. The hydraulically operated parts and the lubrication regions are included in the power transmission system.

According to further another aspect of the disclosure, a control system installed on a vehicle having an electric motor as a drive power source. The vehicle includes an inverter and a power storage device. The electric motor is connected to a power storage device via an inverter. The control system includes an electronic control unit configured to switch the vehicle between an automatic driving mode using automatic drive control, and a manual driving mode in which the vehicle is operated by a driver. The electronic control unit is configured to limit a load factor of the electric motor, in a case where a temperature of the inverter is higher than a first threshold temperature when the vehicle travels in the automatic driving mode, and a case where the temperature of the inverter is higher than a second threshold temperature when the vehicle travels in the manual driving mode. The second threshold temperature is set to a value that is higher than the first threshold temperature.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
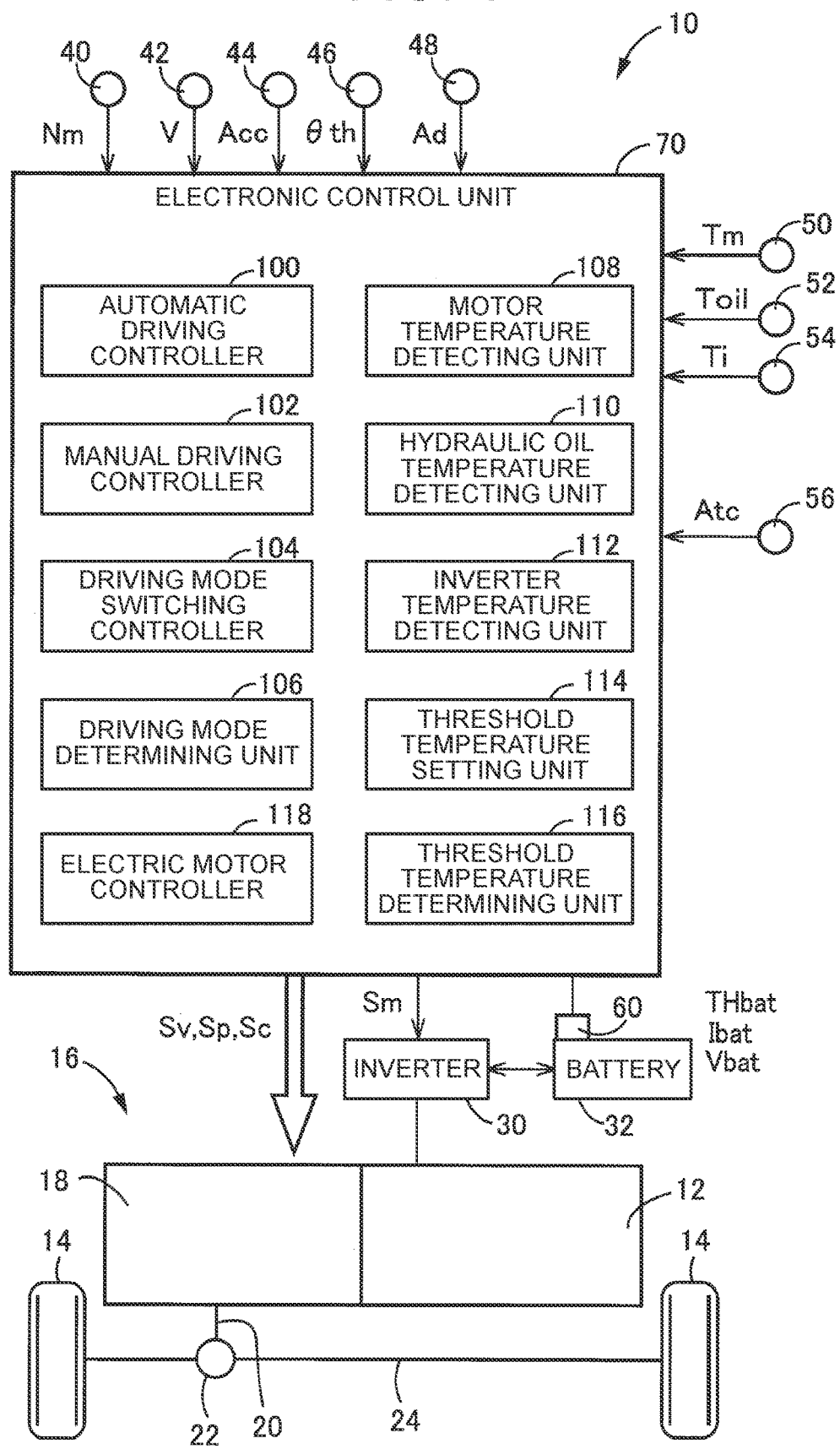
FIG. 1 is a view illustrating the general configuration of parts associated with a vehicle to which the disclosure is applied, and is also a view illustrating a principal part of a control system and control functions for controlling the respective parts.

This disclosure is preferably applied to an electric vehicle, or the like, including only an electric motor as a drive power source, but may also be applied to a hybrid vehicle, or the like, having an engine as an internal combustion engine that generates power by burning fuel, in addition to the electric motor, as drive power sources for propelling the vehicle. This disclosure may also be applied to an electric vehicle, hybrid vehicle, or the like, including one or more electric motors as drive power source(s), and may be applied to a series type hybrid vehicle or a parallel type hybrid vehicle. As the electric motor, an electric motor, or a motor-generator that can selectively use the functions of the electric motor and a generator, may be used.

The vehicle that employs automatic driving technology according to the disclosure means not only a vehicle in which a steering system and an accelerator pedal position (or throttle opening) are automatically controlled, but also a vehicle in which only the accelerator pedal position (or throttle opening) is automatically controlled, for example, a vehicle having an automatic cruise function.

One embodiment of the disclosure will be described in detail with reference to the drawings. In the following embodiment, respective parts or components shown in the drawings are simplified or modified as needed, and the ratios of dimensions, shapes, etc. of the parts or components are not necessarily accurately illustrated.

FIG. 1 illustrates the general configuration of parts or components of a vehicle 10, and also illustrates a principal part of a control system and control functions for controlling the parts or components. The vehicle 10 is an electric vehicle including an electric motor 12 as a drive power source. The vehicle 10 includes a power transmission system 16 on a power transmission path between the electric motor 12 and drive wheels 14.

The power transmission system 16 includes a transmission 18 that provides a part of the power transmission path, engagement devices, such as a clutch and a brake (not shown), which connect and disconnect the power transmission path between the electric motor 12 and the transmission 18, and actuators (not shown) that switch the engagement devices between an engaged state and a released state. The power transmission system 16 also includes a propeller shaft 20 coupled to a transmission output shaft (not shown) as an output rotating member of the transmission 18, a differential gear device 22 coupled to the propeller shaft 20, a pair of axles 24 coupled to the differential gear device 22, and so forth. The transmission 18 is preferably in the form of a multi-speed transmission of planetary gear type, which includes a single pinion type planetary gear unit, and functions as an automatic transmission having two or more gear positions, or in the form of an electric continuously variable transmission of which the speed ratio is controlled by causing an electronic control unit 70 that will be described later to control an inverter 30 so as to control the operating state of the electric motor 12. In operation, hydraulic oil, or ATF (automatic transmission fluid), is supplied to hydraulically operated parts and lubrication regions of the vehicle 10, through driving of an oil pump (not shown), for example. The hydraulically operated parts and the lubrication regions are included in the power transmission system 16. The hydraulically operated parts include the above-mentioned engagement devices and transmission 18, for example. The lubrication regions include engaging portions of the engagement devices, and bearings of respective parts of the power transmission system 16.

As shown in FIG. 1, the electric motor 12 is connected to a power storage device, or battery 32, included in the vehicle 10, via the inverter 30. The inverter 30 is controlled by the electronic control unit 70 that will be described later, so that output torque of the electric motor 12 is controlled.

The vehicle 10 includes the electronic control unit 70 as a control system that controls each part associated with traveling of the vehicle 10. The electronic control unit 70 includes a so-called microcomputer including a central processing unit (CPU), random access memory (RAM), read-only memory (ROM), input-output interface, etc., for example. The CPU executes various controls of the vehicle 10, by performing signal processing according to programs stored in the ROM in advance, while utilizing the temporary storage function of the RAM.

The electronic control unit 70 is supplied with various input signals detected by various sensors included in the vehicle 10. For example, the electronic control unit 70 is supplied with a signal indicative of the rotational speed Nm (rpm) of the electric motor 12 detected by a rotational speed sensor 40, a signal indicative of the vehicle speed V (km/h) detected by a vehicle speed sensor 42, a signal indicative of the accelerator pedal stroke (operation amount) Acc (%) detected by an accelerator pedal position sensor 44, a signal indicative of the throttle opening θth (%) detected by a throttle opening sensor 46, and so forth. The electronic control unit 70 is also supplied with an automatic driving selection signal Ad detected by an automatic driving selection switch 48 with which the driver selects automatic driving, a signal indicative of the motor temperature Tm (° C.) detected by a motor temperature sensor 50, a signal indicative of the hydraulic oil temperature Toil (° C.) of hydraulic oil supplied to the hydraulically operated parts and lubrication regions, which temperature is detected by a hydraulic oil temperature sensor 52, a signal indicative of the inverter temperature Ti (° C.) detected by an inverter temperature sensor 54, a signal Atc detected by an automatic cruise control switch 56 with which the driver sets traveling under automatic cruise control, signals indicative of the battery temperature THbat, battery charge/discharger current Ibat, and battery voltage Vbat of the battery 32 detected by a battery sensor 60, and so forth.

The electronic control unit 70 is also supplied with various signals other than those indicated above. For example, the electronic control unit 70 is supplied with a brake signal detected by a foot brake sensor, a signal indicative of the operation position of a shift lever detected by a shift position sensor, a signal detected by a course recognition and obstacle detection sensor, such as a vehicle-mounted camera, a signal detected by a GPS antenna or an antenna for external network communications, a signal detected by a power mode selection switch used for selecting a predetermined power mode in which the vehicle travels such that it can be driven in a condition where the power performance is prioritized over the fuel economy performance, and so forth.

The electronic control unit 70 outputs a motor control command signal Sm for operating the inverter 30 that controls the electric motor 12, valve command signals Sv that operate electronic valves (not shown) for controlling actuators (not shown) of the clutch and brake of the transmission 18, shift range signal Sp that designates a shift range of a shift device (not shown), acceleration or deceleration, steering and braking signals Sc for use in automatic driving, and so forth.

As shown in FIG. 1, the electronic control unit 70 functionally includes, as a principal part of control functions, an automatic driving controller 100, manual driving controller 102, driving mode switching controller 104, driving mode determining unit 106, motor temperature detecting unit 108, hydraulic oil temperature detecting unit 110, inverter temperature detecting unit 112, threshold temperature setting unit 114, threshold temperature determining unit 116, and electric motor controller 118.

When the vehicle 10 travels in an automatic driving mode, the automatic driving controller 100 controls automatic driving to enable autonomous traveling, namely, traveling that does not require the driver to perform acceleration and deceleration, steering and braking operation on the vehicle 10. The automatic driving includes automatic cruise traveling, i.e., autonomous traveling where drive power is controlled independently of the accelerator operation of the driver, so that the vehicle speed is kept at a constant speed during manual driving by the driver. The autonomous traveling refers to traveling where at least the accelerator operation is automatically controlled. The automatic driving includes driverless traveling having no driver in the vehicle 10, and manned traveling having a driver in the vehicle 10.

When the automatic driving is not selected, and the vehicle 10 travels in a manual driving mode, the manual driving controller 102 controls manual driving to enable manual traveling based on signals concerned with the driver's driving operation on the vehicle 10, for example, operation performed on the accelerator pedal, brake pedal, shift lever, etc. More specifically, the manual driving controller 102 controls the vehicle 10, based on the accelerator pedal stroke signal Acc of the accelerator pedal position sensor 44, brake signal of the foot brake switch, operation position of the shift lever, etc.

The driving mode switching controller 104 executes switching control for switching the driving mode, such that the automatic driving controller 100 controls automatic driving when automatic driving is selected with the automatic driving selection switch 48, for example, and the manual driving controller 102 controls manual driving when the automatic driving mode is not selected with the automatic driving selection switch 48. Also, the driving mode switching controller 104 executes switching control for switching the vehicle to the manual driving mode or manual driving, when it determines that driving operation, such as accelerator operation, braking operation, or steering operation, is performed by the driver, during automatic driving, namely, while the vehicle 10 is traveling in the automatic driving mode. Also, the driving mode switching controller 104 executes switching control for switching the vehicle to the manual driving mode, when it determines that the vehicle 10 is in a situation where automatic driving cannot be safely performed, due to hacking into the electronic control unit 70 via a communication line, or an emergency, such as a send/receive error of a communication signal, during automatic driving.

The driving mode determining unit 106 determines whether the vehicle 10 is traveling in the automatic driving mode in which the vehicle 10 can travel autonomously, namely, whether automatic driving is selected with the automatic driving selection switch 48. When the automatic driving selection switch 48 is operated so as to switch the vehicle from automatic driving to manual driving, the driving mode determining unit 106 determines that the vehicle 10 is traveling in the manual driving mode, namely, the vehicle 10 is manually driven or operated. Also, when the vehicle 10 is switched from automatic driving to manual driving, the driving mode determining unit 106 determines whether manual driving is continued after a lapse of a predetermined time "t".

The motor temperature detecting unit 108 detects the motor temperature, i.e., temperature Tm of the electric motor 12, based on a signal generated from the motor temperature sensor 50. The hydraulic oil temperature detecting unit 110 detects the hydraulic oil temperature Toil of the hydraulic oil, based on a signal generated from the hydraulic oil temperature sensor 52. The inverter temperature detection unit 112 detects the temperature Ti of the inverter 30, based on a signal generated from the inverter temperature sensor 54. The hydraulic oil temperature Toil of the hydraulic oil and the temperature Ti of the inverter 30 change in association with the temperature Tm of the electric motor 12.

Figure 2:
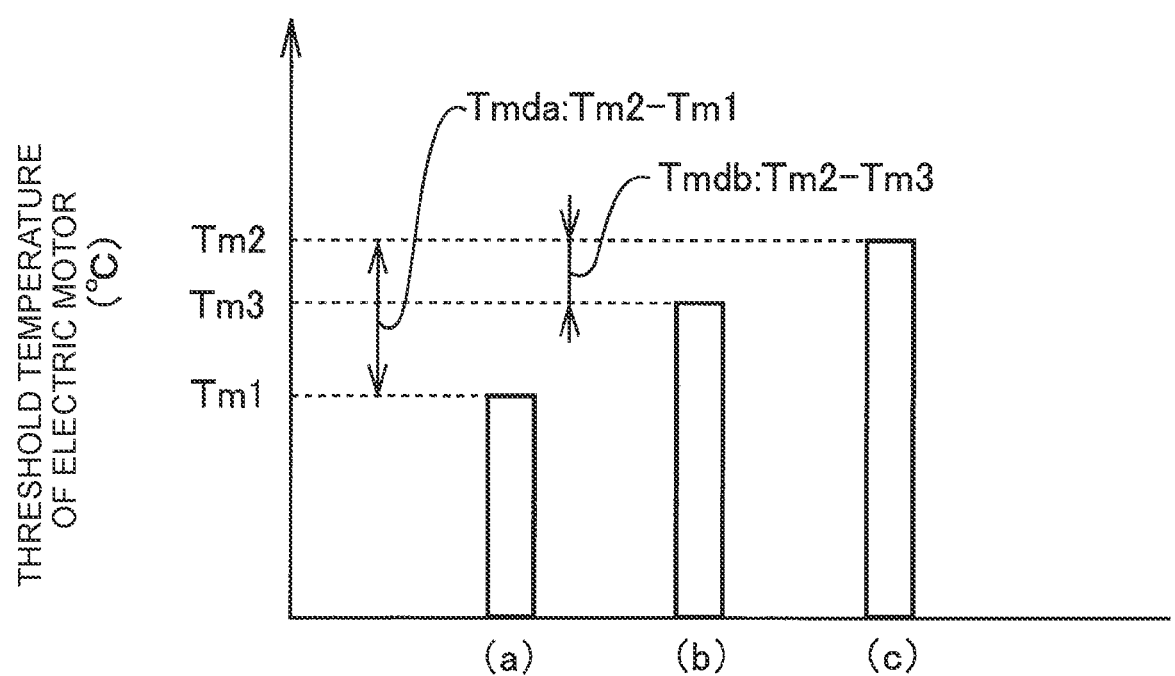
FIG. 2 is a view showing threshold temperatures of an electric motor used during automatic driving and during manual driving.

The threshold temperature setting unit 114 sets a threshold temperature for use in the automatic driving mode and a threshold temperature for use in the manual driving mode. FIG. 2 shows threshold temperatures of the electric motor 12 for use in the automatic driving mode and manual driving mode. On the horizontal axis of FIG. 2, (a) indicates the case where the vehicle travels in the automatic driving mode, and (b) indicates the case where the vehicle travels in a second automatic driving mode that will be described later, while (c) indicates the case where the vehicle travels in the manual driving mode. On the vertical axis of FIG. 2 indicating the threshold temperature of the electric motor 12, Tm1 denotes a first threshold temperature of the electric motor 12 when the vehicle is in the automatic driving mode, and Tm3 denotes a first threshold temperature Tm3 of the electric motor 12 when the vehicle is in the second automatic driving mode, while Tm2 denotes a second threshold temperature of the electric motor 12 when the vehicle is in the manual driving mode. In FIG. 2, Tmda denotes a threshold temperature difference between the second threshold temperature Tm2 and the first threshold temperature Tm1, and Tmdb denotes a threshold temperature difference between the second threshold temperature Tm2 and the first threshold temperature Tm3. The threshold temperature setting unit 114 sets the threshold temperatures such that the second threshold temperature Tm2 is higher than the first threshold temperature Tm1. The threshold temperature is a value empirically obtained or calculated by design in advance. When the temperature of the electric motor 12 increases to be higher than the threshold temperature, for example, the performance of the electric motor 12 may deteriorate, and the electric motor 12 may not be able to sufficiently deliver output torque corresponding to drive torque requested by the driver, which may result in reduction of the response of the vehicle 10.

If the driving mode determining unit 106 determines that manual driving is continued after a lapse of a predetermined time "t" from the time when the driving mode is switched by the driving mode switching controller 104 from automatic driving to manual driving, for example, the threshold temperature setting unit 114 sets the second threshold temperature Tm2 of the electric motor 12 to a value equal to the first threshold temperature Tm1. The predetermined time "t", which is a value empirically obtained or calculated by design in advance, is sufficient time required for the driver to avoid a danger, when the driver switches the driving mode from automatic driving to manual driving so as to avoid an obstacle on a road on which the vehicle is traveling, for example. For the predetermined time "t", high output torque is required to be generated through driving operation, such as acceleration/deceleration, steering, and braking, on the vehicle 10. Namely, the second threshold temperature Tm2 is temporarily changed to a threshold temperature that is higher than the first threshold temperature Tm1 in the predetermined time "t", when the driving mode is switched from automatic driving to manual driving.

When the second automatic driving mode having a high degree of freedom in traveling, like the power mode in which the power performance is prioritized over the fuel economy performance, is selected, the threshold temperature setting unit 114 sets the first threshold temperature Tm3, such that the threshold temperature difference Tmdb between the second threshold temperature Tm2 and the first threshold temperature Tm3 of the electric motor 12 shown in FIG. 2 is smaller than the threshold temperature difference Tmda between the second threshold temperature Tm2 and the first threshold temperature Tm1. Namely, the threshold temperature setting unit 114 sets the first threshold temperature Tm3 of the second automatic driving mode having a high degree of freedom in traveling, to a value that is higher than the first threshold temperature Tm1 of the normal automatic driving mode that is not the power mode and has a lower degree of freedom in traveling than the second automatic driving mode.

During automatic driving, the threshold temperature determining unit 116 determines whether the temperature Tm of the electric motor 12 is equal to or lower than the first threshold temperature Tm1 for automatic driving. Also, the threshold temperature determining unit 116 determines, during manual driving, whether the temperature Tm of the electric motor 12 is equal to or lower than the second threshold temperature Tm2 for manual driving.

The electric motor controller 118 controls the load factor of the electric motor 12, based on a temperature situation of the electric motor 12 detected by the motor temperature detecting unit 108. More specifically, during automatic driving, the electric motor controller 118 limits the load factor of the electric motor 12, when the temperature Tm of the electric motor 12 is not equal to or lower than the first threshold temperature Tm1 for automatic driving, namely, when the temperature Tm of the electric motor 12 is higher than the first threshold temperature Tm1. Also, during manual driving, the electric motor controller 118 limits the load factor of the electric motor 12, when the temperature Tm of the electric motor 12 is higher than the second threshold temperature Tm2 for manual driving. The load factor indicates the percentage (%) of the actual load with respect to a predetermined rated load (100%) of the electric motor 12, or the proportion of the output torque that can be generated from the electric motor 12 to the maximum output torque of the electric motor 12. With the load factor of the electric motor 12 thus limited, the output torque that can be generated from the electric motor 12 is limited, so that the temperature Tm of the electric motor 12 can be made less likely or unlikely to be increased. When the load factor of the electric motor 12 is limited during traveling of the vehicle, limited torque traveling is performed in a condition where the load factor of the electric motor 12 is limited, namely, in a condition where the output torque of the electric motor 12 is limited. Accordingly, as the threshold temperature set by the threshold temperature setting unit 114 is higher, a limit value of the load factor of the electric motor 12, namely, the upper limit of the output torque of the electric motor 12, is raised; therefore, the range of torque that can be generated according to drive torque requested by the driver is expanded, and the response of the vehicle is improved.

Figure 3:
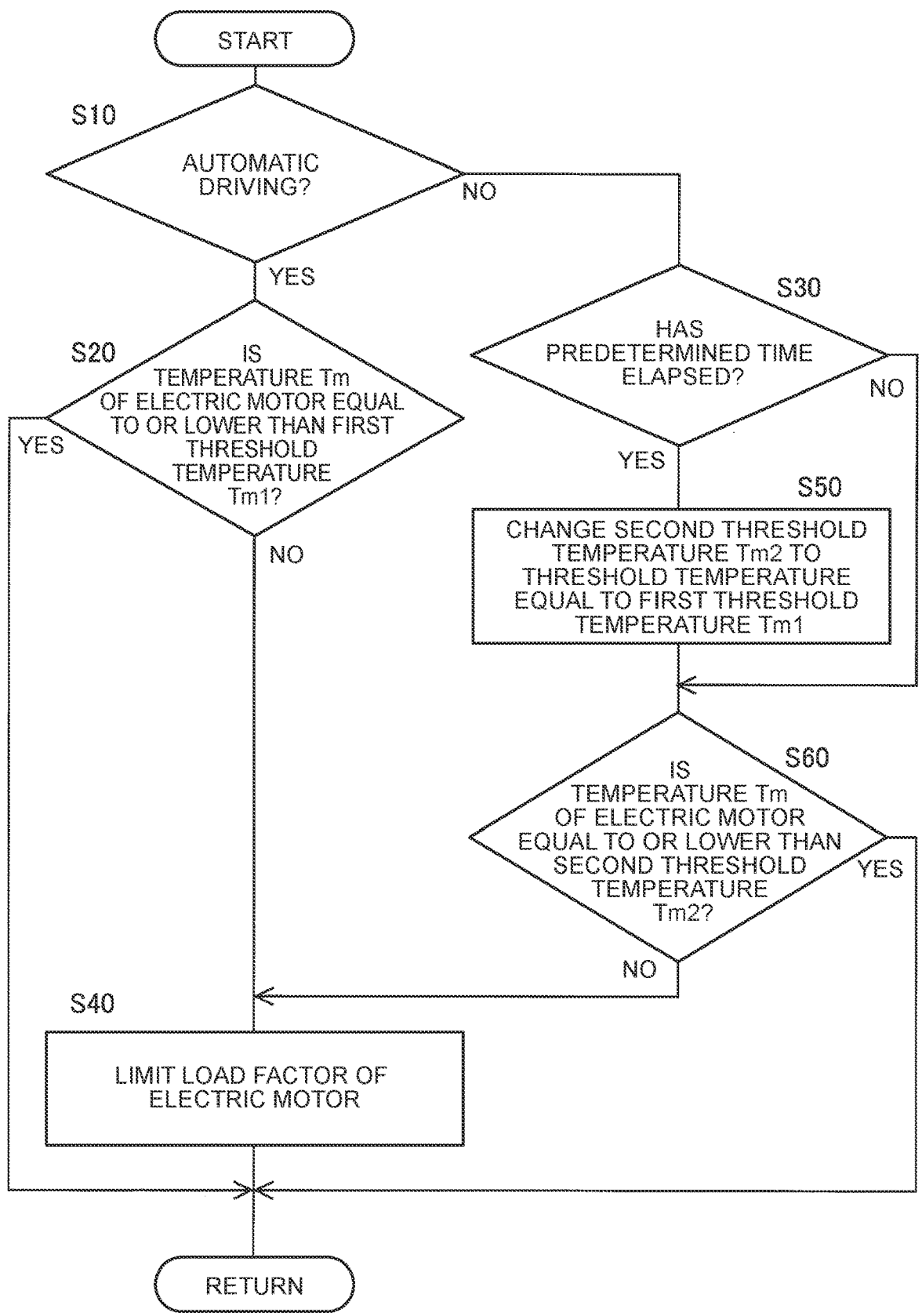
FIG. 3 is a flowchart illustrating a principal part of control operation of a control system of the vehicle for controlling the load factor of the electric motor based on the temperature of the electric motor.

FIG. 3 is a flowchart illustrating a control routine as a principal part of control operation of the electronic control unit 70 for controlling the load factor of the electric motor 12, based on the temperature Tm of the electric motor 12. The control routine of FIG. 3 is repeatedly executed.

In step S10, the driving mode determining unit 106 determines whether the vehicle 10 is traveling in the automatic driving mode, namely, whether the vehicle 10 is automatically driven with the automatic driving mode selected with the automatic driving selection switch 48. When an affirmative decision (YES) is obtained in step S10, namely, when the vehicle 10 is automatically driven, step S20 corresponding to the threshold temperature determining unit 116 is executed. When a negative decision (NO) is obtained in step S10, namely, when the vehicle 10 is traveling in the manual driving mode in which it is not automatically driven, step S30 corresponding to the driving mode determining unit 106 is executed.

In step S20, the threshold temperature determining unit 116 determines whether the temperature Tm of the electric motor 12 during automatic driving is equal to or lower than the first threshold temperature Tm1. When an affirmative decision (YES) is obtained in step S20, namely, when the temperature Tm of the electric motor 12 during automatic driving is equal to or lower than the first threshold temperature Tm1, the current cycle of this routine ends. When a negative decision (NO) is obtained in step S20, namely, when the temperature Tm of the electric motor 12 during automatic driving is higher than the first threshold temperature Tm1, step S40 corresponding to the electric motor controller 118 is executed.

In step S40 corresponding to the electric motor controller 118, the load factor of the electric motor 12 is limited, and the vehicle 10 performs limited torque traveling such that the output torque of the electric motor 12 is limited. After the load factor of the electric motor 12 is limited, the current cycle of this routine ends.

In step S30, the driving mode determining unit 106 determines whether manual driving is continued after a lapse of the predetermined time "t". When an affirmative decision (YES) is obtained in step S30, namely, when manual driving is continued after the lapse of the predetermined time "t", step S50 corresponding to the threshold temperature setting unit 114 is executed. When a negative decision (NO) is obtained in step S30, namely, when manual driving is not continued after the lapse of the predetermined time "t", step S60 corresponding to the threshold temperature determining unit 116 is executed.

In step S50 corresponding to the threshold temperature setting unit 114, the second threshold temperature Tm2 of the electric motor 12 for manual driving is changed to a threshold temperature equal to the first threshold temperature Tm1 of the electric motor 12 for automatic driving. After the second threshold temperature Tm2 is thus changed, step S60 corresponding to the threshold temperature determining unit 116 is executed.

In step S60, the threshold temperature determining unit 116 determines whether the temperature Tm of the electric motor 12 during manual driving is equal to or lower than the second threshold temperature Tm2 for manual driving. When an affirmative decision (YES) is obtained in step S60, namely, when the temperature Tm of the electric motor 12 during manual driving is equal to or lower than the second threshold temperature Tm2, the current cycle of this routine ends. When a negative decision (NO) is obtained in step S60, namely, when the temperature Tm of the electric motor 12 during manual driving is higher than the second threshold temperature Tm2, step S40 corresponding to the electric motor controller 118 is executed. The control routine of the flowchart of FIG. 3 is executed in a similar manner when the first threshold temperature Tm1 is the first threshold temperature Tm3 of the electric motor 12 for use in the second automatic driving mode.

As described above, the electronic control unit 70 of the vehicle 10 of this embodiment includes the electric motor controller 118 that limits the load factor of the electric motor 12, in the case where the temperature Tm of the electric motor 12 during automatic driving is higher than the first threshold temperature Tm1 for automatic driving, and the case where the temperature Tm of the electric motor 12 during manual driving is higher than the second threshold temperature Tm2 for manual driving. Further, the electronic control unit 70 of the vehicle 10 includes the threshold temperature setting unit 114 that sets the second threshold temperature Tm2 to a value that is higher than the first threshold temperature Tm1. Thus, since the second threshold temperature Tm2 is set to be higher than the first threshold temperature Tm1, the load factor of the electric motor 12 is not limited during manual driving, even at temperatures at which the load factor would be limited by the electric motor controller 118 during automatic driving. Therefore, when the driving mode is switched from automatic driving to manual driving, in a condition where the load factor of the electric motor 12 is limited, for example, the drive torque requested by the driver is delivered from the electric motor 12, with no limitations placed on the output torque of the electric motor 12; thus, reduction of the response of the vehicle 10 can be curbed.

According to the control system of the vehicle 10 of this embodiment, when the vehicle 10 is switched by the driving mode switching controller 104 from the automatic driving mode to the manual driving mode, the threshold temperature setting unit 114 sets the second threshold temperature Tm2 to a value equal to the first threshold temperature Tm1 after a lapse of the predetermined time "t". Thus, when the driving mode is switched from automatic driving to manual driving, the second threshold temperature Tm2 is changed to a threshold temperature equal to the first threshold temperature Tm1 after the lapse of the predetermined time "1"; therefore, the response of the vehicle 10 can be made less likely or unlikely to be reduced due to limitations placed on the output torque of the electric motor 12 by the electric motor controller 118, and the temperature of the electric motor 12 can be made less likely or unlikely to be increased.

According to the control system of the vehicle 10 of this embodiment, when the second automatic driving mode having a high degree of freedom in traveling, like the power mode in which the power performance is prioritized over the fuel economy performance, is selected, the threshold temperature setting unit 114 sets the first threshold temperature Tm3, such that the threshold temperature difference Tmdb between the second threshold temperature Tm2 and the first threshold temperature Tm3 is smaller than the threshold temperature difference Tmda between the second threshold temperature Tm2 and the first threshold temperature Tm1. Thus, since the first threshold temperature Tm3 for the second automatic driving mode is set to be higher than the first threshold temperature Tm1 for the normal automatic driving mode that is not the power mode, the load factor of the electric motor 12 is less likely to be limited in the second automatic driving mode. Thus, in the second automatic driving mode, the degree of freedom in traveling can be elevated to be higher than that of the normal automatic driving mode, and the load factor of the electric motor 12 is less likely or unlikely to be limited by the electric motor controller 118 when the driving mode is switched from the manual driving mode to the second automatic driving mode, for example.

Next, other embodiments of the disclosure will be described. The same reference numerals are assigned to portions or components common to the above first embodiment, and these portions or components will not be further described.

Figure 4:
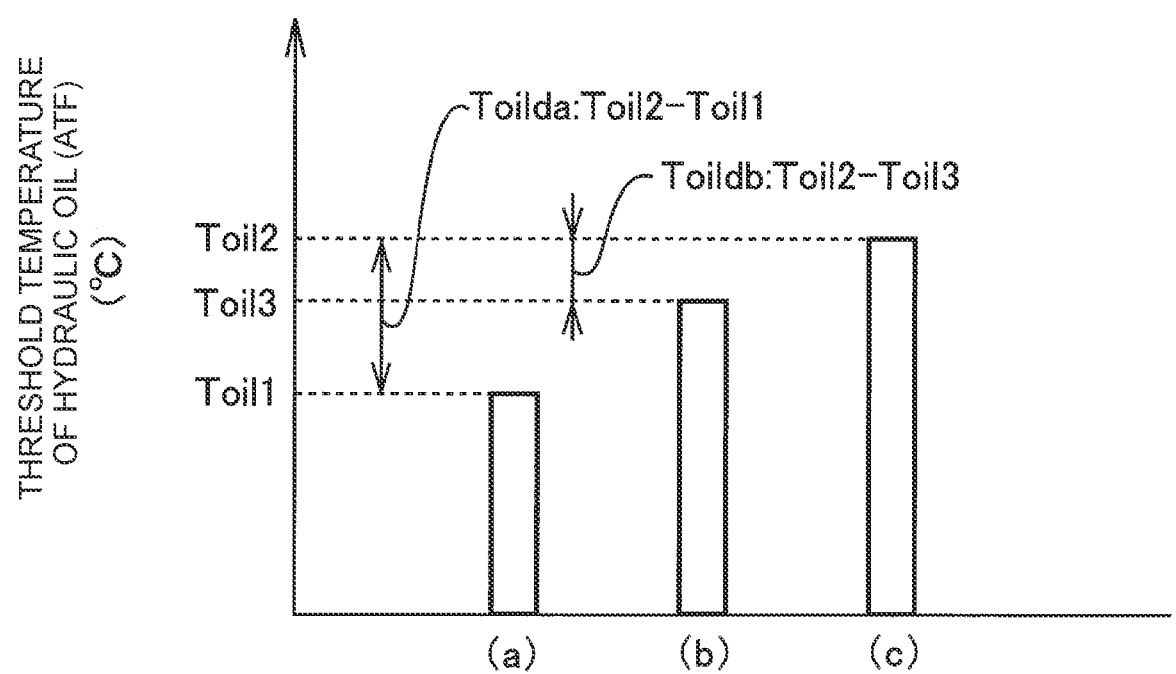
FIG. 4 is a view showing threshold temperatures of hydraulic oil used during automatic driving and during manual driving, in another embodiment of the disclosure.

FIG. 4 shows threshold temperatures of hydraulic oil or ATF (automatic transmission fluid) for use in the automatic driving mode and the manual driving mode according to another embodiment. As shown in FIG. 4, the threshold temperature setting unit 114 sets a second threshold temperature Toil2, namely, a threshold temperature of the hydraulic oil for use in the manual driving mode, to a value higher than a first threshold temperature Toil1, namely, a threshold temperature of the hydraulic oil for use in the automatic driving mode. On the horizontal axis of FIG. 4, (a) indicates the case where the vehicle travels in the automatic driving mode, and (b) indicates the case where the vehicle travels in the second automatic driving mode, while (c) indicates the case where the vehicle travels in the manual driving mode. On the vertical axis of FIG. 4 indicating the threshold temperature of the hydraulic oil, Toil1 denotes the first threshold temperature of the hydraulic oil for use in the automatic driving mode, and Toil3 denotes the first threshold temperature of the hydraulic oil for use in the second automatic driving mode, while Toil2 denotes the second threshold temperature of the hydraulic oil for use in the manual driving mode. In FIG. 4, Toilda denotes a threshold temperature difference between the second threshold temperature Toil2 and the first threshold temperature Toil1, and Toildb denotes a threshold temperature difference between the second threshold temperature Toil2 and the first threshold temperature Toil3. The threshold temperature setting unit 114 sets the threshold temperatures such that the second threshold temperature Toil2 is higher than the first threshold temperature Toil1.

When the driving mode determining unit 106 determines that manual driving is continued after a lapse of a predetermined time "t" from the time when the driving mode is switched by the driving mode switching controller 104 from automatic driving to manual driving, for example, the threshold temperature setting unit 114 sets the second threshold temperature Toil2 of the hydraulic oil to a value equal to the first threshold temperature Toil1. Also, when the second automatic driving mode having a high degree of freedom in traveling, like the power mode in which the power performance is prioritized over the fuel economy performance, is selected, the threshold temperature setting unit 114 sets the first threshold temperature Toil3, such that the threshold temperature difference Toildb between the second threshold temperature Toil2 and first threshold temperature Toil3 of the hydraulic oil shown in FIG. 4 is smaller than the threshold temperature difference Toilda between the second threshold temperature Toil2 and the first threshold temperature Toil1. Namely, the threshold temperature setting unit 114 sets the first threshold temperature Toil3 for the second automatic driving mode having a high degree of freedom in traveling, to a value higher than the first threshold temperature Toil1 for the normal automatic driving mode that is not the power mode and has a lower degree of freedom in traveling than the second automatic driving mode.

During automatic driving, the threshold temperature determining unit 116 determines whether the temperature Toil of the hydraulic oil is equal to or lower than the first threshold temperature Toil1 for automatic driving. Also, the threshold temperature determining unit 116 determines, during manual driving, whether the temperature of the hydraulic oil is equal to or lower than the second threshold temperature Toil2 for manual driving.

Figure 5:
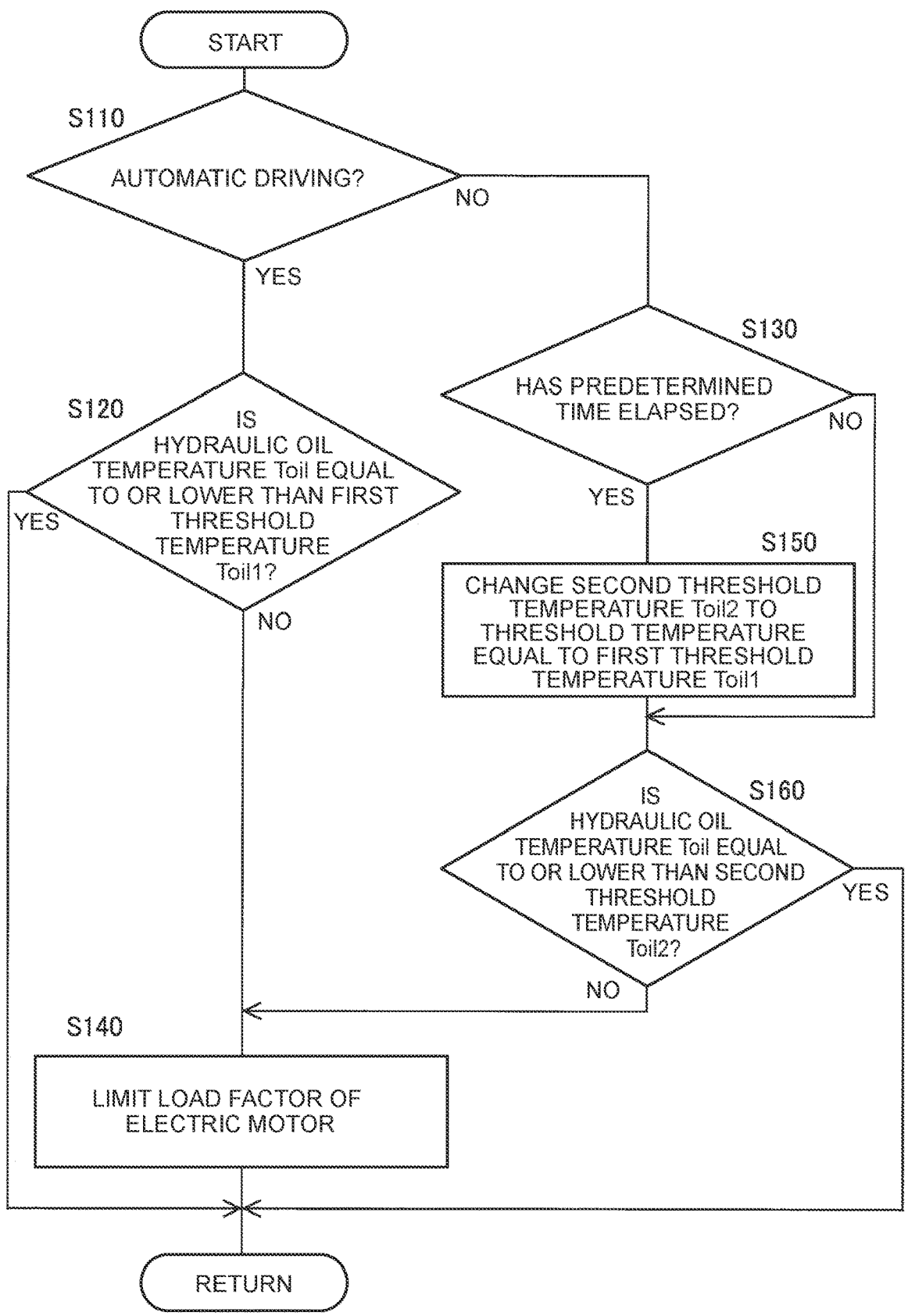
FIG. 5 is a flowchart illustrating a principal part of control operation of the control system of the vehicle for controlling the load factor of the electric motor, based on the hydraulic oil temperature of the hydraulic oil, in the embodiment of FIG. 4.

FIG. 5 is a flowchart illustrating a control routine as a principal part of control operation of the electronic control unit 70 for controlling the load factor of the electric motor 12, based on the temperature Toil of the hydraulic oil. The control routine of FIG. 5 is repeatedly executed.

In step S110, the driving mode determining unit 106 determines whether the vehicle 10 is traveling in the automatic driving mode, namely, whether automatic driving is selected. When an affirmative decision (YES) is obtained in step S110, namely, when the vehicle 10 is automatically driven, step S120 corresponding to the threshold temperature determining unit 116 is executed. When a negative decision (NO) is obtained in step S110, namely, when the vehicle 10 is in the manual driving mode in which it is not automatically driven, step S130 corresponding to the driving mode determining unit 106 is executed.

In step S120, the threshold temperature determining unit 116 determines whether the temperature Toil of the hydraulic oil during automatic driving is equal to or lower than the first threshold temperature Toil1. When an affirmative decision (YES) is obtained in step S120, namely, when the temperature Toil of the hydraulic oil during automatic driving is equal to or lower than the first threshold temperature Toil1, the current cycle of this routine ends. When a negative decision (NO) is obtained in step S120, namely, when the temperature Toil of the hydraulic oil during automatic driving is higher than the first threshold temperature Toil1, step S140 corresponding to the electric motor controller 118 is executed.

In step S140 corresponding to the electric motor controller 118, the load factor of the electric motor 12 is limited, and the vehicle 10 travels with limited output torque. After the load factor of the electric motor 12 is limited, the current cycle of this routine ends.

In step S130, the driving mode determining unit 106 determines whether manual driving is continued after a lapse of the predetermined time "t". When an affirmative decision (YES) is obtained in step S130, namely, when manual driving is continued after the lapse of the predetermined time "t", step S150 corresponding to the threshold temperature setting unit 114 is executed. When a negative decision (NO) is obtained in step S130, namely, when manual driving is not continued after the lapse of the predetermined time "t", step S160 corresponding to the threshold temperature determining unit 116 is executed.

In step S150 corresponding to the threshold temperature setting unit 114, the second threshold temperature Toil2 of the hydraulic oil for manual driving is changed to a threshold temperature that is equal to the first threshold temperature Toil1 of the hydraulic oil for automatic driving. Once the second threshold temperature Toil2 is changed, step S160 corresponding to the threshold temperature determining unit 116 is executed.

In step S160, the threshold temperature determining unit 116 determines whether the temperature Toil of the hydraulic oil during manual driving is equal to or lower than the second threshold temperature Toil2 for manual driving. When an affirmative decision (YES) is obtained in step S160, namely, when the temperature Toil of the hydraulic oil during manual driving is equal to or lower than the second threshold temperature Toil2, the current cycle of this routine ends. When a negative decision (NO) is obtained in step S160, namely, when the temperature Toil of the hydraulic oil during manual driving is higher than the second threshold temperature Toil2, step S140 corresponding to the electric motor controller 118 is executed. The control routine of the flowchart of FIG. 5 is executed in a similar manner when the first threshold temperature Toil1 is the first threshold temperature Toil3 of the hydraulic oil for use in the second automatic driving mode.

According to the control system of the vehicle 10 of this embodiment, the load factor of the electric motor 12 is limited, in the case where the temperature Toil of the hydraulic oil, or ATF (automatic transmission fluid), supplied to hydraulically operated parts and lubrication regions, is higher than the first threshold temperature Toil during automatic driving, and the case where the hydraulic oil temperature Toil is higher than the second threshold temperature Toil2 during manual driving. The hydraulically operated parts and the lubrication regions are included in the power transmission system 16 provided on the power transmission path between the electric motor 12 and the drive wheels 14. Thus, the electric motor controller 118 can limit the load factor of the electric motor 12, based on the hydraulic oil temperature Toil of the hydraulic oil as well as the temperature Tm of the electric motor 12, so that the electric motor can be controlled based on more appropriate conditions. The hydraulically operated parts and the lubrication regions may be further included in the other parts in the vehicle 10 other than the power transmission system 16.

According to the control system of the vehicle 10 of this embodiment, when the vehicle 10 is switched by the driving mode switching controller 104 from the automatic driving mode to the manual driving mode, the threshold temperature setting unit 114 sets the second threshold temperature Toil2 to a value equal to the first threshold temperature Toil1 after a lapse of the predetermined time "t". Thus, when the driving mode is switched from automatic driving to manual driving, the second threshold temperature Toil2 is changed to a threshold temperature equal to the first threshold temperature Toil1 after the lapse of the predetermined time "t"; therefore, the response of the vehicle 10 can be made less likely or unlikely to be reduced due to limitations placed on the output torque of the electric motor 12 by the electric motor controller 118, and the temperature of the electric motor 12 can be made less likely or unlikely to be increased.

According to the control system of the vehicle 10 of this embodiment, when the second automatic driving mode having a high degree of freedom in traveling, like the power mode in which the power performance is prioritized over the fuel economy performance, is selected, the threshold temperature setting unit 114 sets the first threshold temperature Toil3 such that the threshold temperature difference Toildb between the second threshold temperature Toil2 and the first threshold temperature Toil3 is smaller than the threshold temperature difference Toilda between the second threshold temperature Toil2 and the first threshold temperature Toil1. Thus, in the second automatic driving mode, the load factor of the electric motor 12 is less likely to be limited, than that in the normal automatic driving mode that is not the power mode. As a result, in the second automatic driving mode, the degree of freedom in traveling can be elevated to be higher than that of the normal automatic driving mode, and the load factor of the electric motor 12 is less likely or unlikely to be limited by the electric motor controller 118 when the driving mode is switched from the manual driving mode to the second automatic driving mode.

Figure 6:
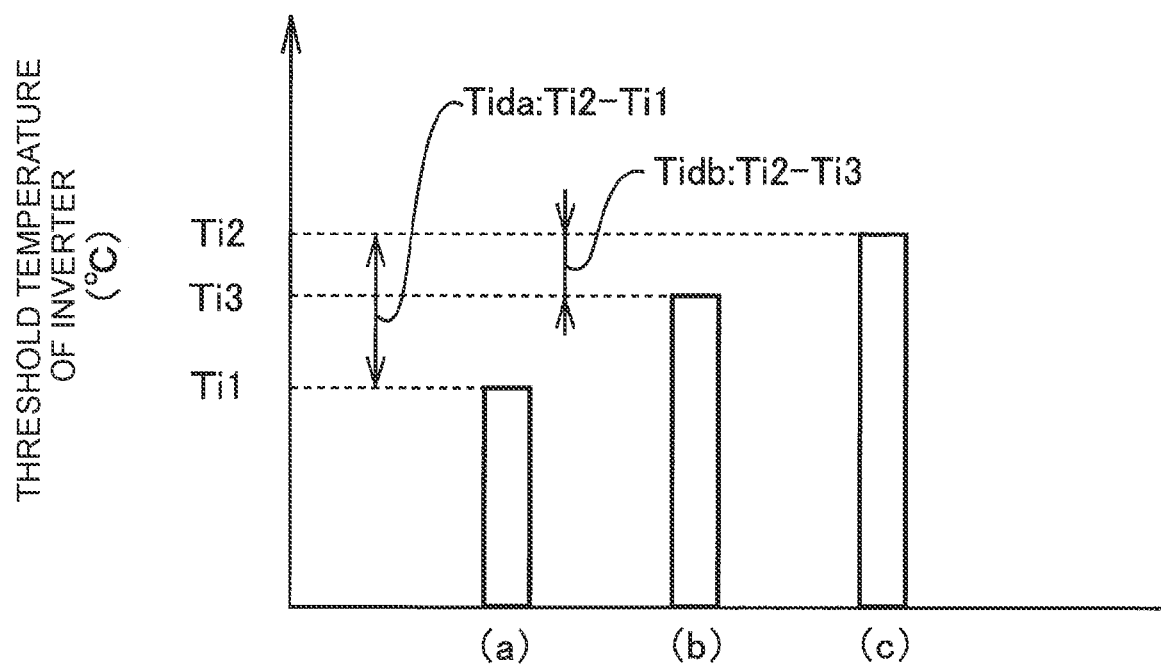
FIG. 6 is a view showing threshold temperatures of an inverter used during automatic driving and during manual driving, in another embodiment of the disclosure.

FIG. 6 shows threshold temperatures of the inverter 30 for use in the automatic driving mode and the manual driving mode according to another embodiment. As shown in FIG. 6, the threshold temperature setting unit 114 sets a second threshold temperature Ti2, namely, a threshold temperature of the inverter 30 for manual driving, to a value higher than a first threshold temperature Ti1, namely, a threshold temperature of the inverter 30 for automatic driving. On the horizontal axis of FIG. 6, (a) indicates the case where the vehicle travels in the automatic driving mode, and (b) indicates the case where the vehicle travels in the second automatic driving mode, while (c) indicates the case where the vehicle travels in the manual driving mode. On the vertical axis of FIG. 6 indicating the threshold temperature of the inverter 30, Ti1 denotes the first threshold temperature of the inverter 30 for use in the automatic driving mode, and Ti3 denotes the first threshold temperature of the inverter 30 for use in the second automatic driving mode, while Ti2 denotes the second threshold temperature of the inverter 30 for use in the manual driving mode. In FIG. 6, Tida denotes a threshold temperature difference between the second threshold temperature Ti2 and the first threshold temperature Ti1, and Tidb denotes a threshold temperature difference between the second threshold temperature Ti2 and the first threshold temperature Ti3. The threshold temperature setting unit 114 sets the threshold temperatures such that the second threshold temperature Ti2 is higher than the first threshold temperature Ti1.

When the driving mode determining unit 106 determines that manual driving is continued after a lapse of a predetermined time "t" from the time when the driving mode is switched by the driving mode switching controller 104 from automatic driving to manual driving, for example, the threshold temperature setting unit 114 sets the second threshold temperature Ti2 of the inverter 30 to a value equal to the first threshold temperature Ti1. Also, when the second automatic driving mode having a high degree of freedom in traveling, like the power mode in which the power performance is prioritized over the fuel economy performance, is selected, the threshold temperature setting unit 114 sets the first threshold temperature Ti3, such that the threshold temperature difference Tidb between the second threshold temperature Ti2 and first threshold temperature Ti3 of the inverter 30 shown in FIG. 6 is smaller than the threshold temperature difference Tida between the second threshold temperature Ti2 and the first threshold temperature Ti1. Namely, the threshold temperature setting unit 114 sets the first threshold temperature Ti3 for the second automatic driving mode having a high degree of freedom in traveling, to a value higher than the first threshold temperature Ti1 for the normal automatic driving mode that is not the power mode and has a lower degree of freedom in traveling than that in the second automatic driving mode.

During automatic driving, the threshold temperature determining unit 116 determines whether the temperature Ti of the inverter 30 is equal to or lower than the first threshold temperature Ti1 for automatic driving. Also, the threshold temperature determining unit 116 determines, during manual driving, whether the temperature Ti of the inverter 30 is equal to or lower than the second threshold temperature Ti2 for manual driving.

Figure 7:
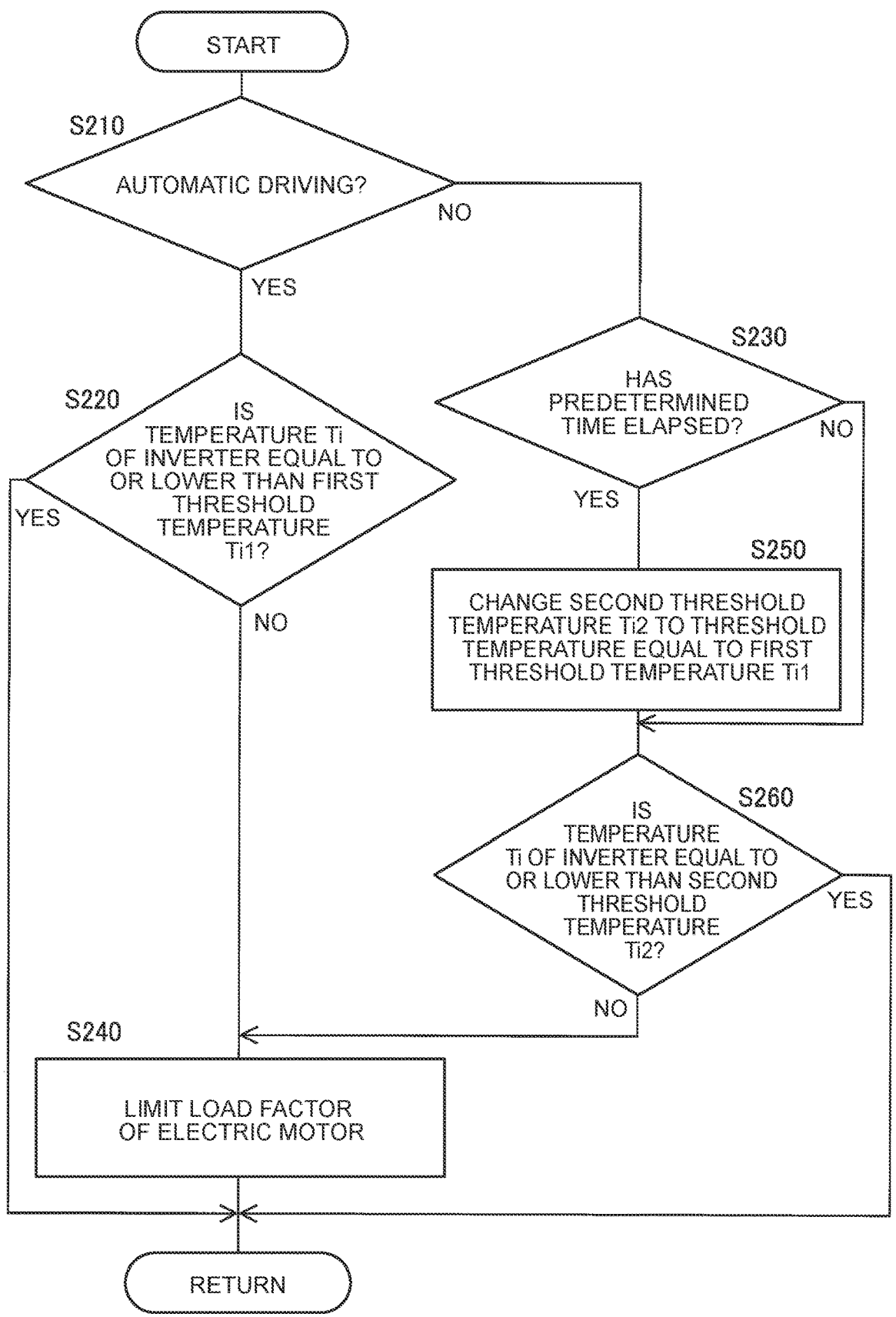
FIG. 7 is a flowchart illustrating a principal part of control operation of the control system of the vehicle for controlling the load factor of the electric motor, based on the temperature of the inverter, in the embodiment of FIG. 6.

FIG. 7 is a flowchart illustrating a control routine as a principal part of control operation of the electronic control unit 70 for controlling the load factor of the electric motor 12, based on the temperature Ti of the inverter 30. The control routine of FIG. 7 is repeatedly executed.

In step S210, the driving mode determining unit 106 determines whether the vehicle 10 is traveling in the automatic driving mode, namely, whether the automatic driving mode is selected. When an affirmative decision (YES) is obtained in step S210, namely, when the vehicle 10 is automatically driven, step S220 corresponding to the threshold temperature determining unit 116 is executed. When a negative decision (NO) is obtained in step S210, namely, when the vehicle 10 is traveling in the manual driving mode in which it is not automatically driven, step S230 corresponding to the driving mode determining unit 106 is executed.

In step S220, the threshold temperature determining unit 116 determines whether the temperature Ti of the inverter 30 during automatic driving is equal to or lower than the first threshold temperature Ti1. When an affirmative decision (YES) is obtained in step S220, namely, when the temperature Ti of the inverter 30 during automatic driving is equal to or lower than the first threshold temperature Ti1, the current cycle of this routine ends. When a negative decision (NO) is obtained in step S220, namely, when the temperature Ti of the inverter 30 during automatic driving is higher than the first threshold temperature Ti1, step S240 corresponding to the electric motor controller 118 is executed.

In step S240 corresponding to the electric motor controller 118, the load factor of the electric motor 12 is limited, and the vehicle 10 travels with limited output torque. After the load factor of the electric motor 12 is limited, the current cycle of this routine ends.

In step S230, the driving mode determining unit 106 determines whether manual driving continues after a lapse of a predetermined time. When an affirmative decision (YES) is obtained in step S230, namely, when manual driving continues after the lapse of the predetermined time, step S250 corresponding to the threshold temperature setting unit 114 is executed. When a negative decision (NO) is obtained in step S230, namely, when manual driving is not continued after the lapse of the predetermined time, step S260 corresponding to the threshold temperature determining unit 116 is executed.

In step S250 corresponding to the threshold temperature setting unit 114, the second threshold temperature Ti2 of the inverter 30 for manual driving is changed to a threshold temperature that is equal to the first threshold temperature Ti1 of the inverter 30 for automatic driving. Once the second threshold temperature Ti2 is changed, step S260 corresponding to the threshold temperature determining unit 116 is executed.

In step S260, the threshold temperature determining unit 116 determines whether the temperature Ti of the inverter 30 during manual driving is equal to or lower than the second threshold temperature Ti2 for manual driving. When an affirmative decision (YES) is obtained in step S260, namely, when the temperature Ti of the inverter 30 during manual driving is equal to or lower than the second threshold temperature Ti2, the current cycle of this routine ends. When a negative decision (NO) is obtained in step S260, namely, when the temperature Ti of the inverter 30 during manual driving is higher than the second threshold temperature Ti2, step S240 corresponding to the electric motor controller 118 is executed. The control routine of the flowchart of FIG. 7 is executed in a similar manner when the first threshold temperature Ti1 is the first threshold temperature Ti3 of the inverter 30 for use in the second automatic driving mode.

According to the control system of the vehicle 10 of this embodiment, the load factor of the electric motor 12 is limited, in the case where the temperature Ti of the inverter 30 is higher than the first threshold temperature Ti1 during automatic driving, and the case where the temperature Ti of the inverter 30 is higher than the second threshold temperature Ti2 during manual driving. Thus, the electric motor controller 118 can limit the load factor of the electric motor 12, based on the temperature Ti of the inverter 30 as well as the temperature Tm of the electric motor 12, so that the electric motor can be controlled based on more appropriate conditions.

According to the control system of the vehicle 10 of this embodiment, when the vehicle 10 is switched by the driving mode switching controller 104 from the automatic driving mode to the manual driving mode, the threshold temperature setting unit 114 sets the second threshold temperature Ti2 to a value equal to the first threshold temperature Ti1 after a lapse of the predetermined time "1". Thus, when the driving mode is switched from automatic driving to manual driving, the second threshold temperature Ti2 is changed to a threshold temperature equal to the first threshold temperature Ti1 after the lapse of the predetermined time "t"; therefore, the response of the vehicle 10 can be made less likely or unlikely to be reduced due to limitations placed on the output torque of the electric motor 12 by the electric motor controller 118, and the temperature of the electric motor 12 can be made less likely or unlikely to be increased.

According to the control system of the vehicle 10 of this embodiment, when the second automatic driving mode having a high degree of freedom in traveling, like the power mode in which the power performance is prioritized over the fuel economy performance, is selected, the threshold temperature setting unit 114 sets the first threshold temperature Ti3 such that the threshold temperature difference Tidb between the second threshold temperature Ti2 and the first threshold temperature Ti3 is smaller than the threshold temperature difference Tida between the second threshold temperature Ti2 and the first threshold temperature Ti1. Thus, in the second automatic driving mode, the load factor of the electric motor 12 is less likely to be limited, than that in the normal automatic driving mode that is not the power mode. As a result, in the second automatic driving mode, the degree of freedom in traveling can be elevated to be higher than that of the normal automatic driving mode, and the load factor of the electric motor 12 is less likely or unlikely to be limited by the electric motor controller 118 when the driving mode is switched from the manual driving mode to the second automatic driving mode.

While the preferred embodiments of the disclosure have been described in detail based on the drawings, the disclosure is not limited to these embodiments, but may be embodied in other forms.

For example, the threshold temperature may be set to a fixed value that is empirically obtained or calculated by design in advance, but may also be set to a variable value that can vary according to conditions of the road on which the vehicle is traveling, for example.

In the illustrated embodiments, the load factor of the electric motor 12 is controlled, based on the temperature Tm of the electric motor 12, or the hydraulic oil temperature Toil of the hydraulic oil or the temperature Ti of the inverter 30, which varies in association with the temperature Tm of the electric motor 12. However, the disclosure is not limited to this arrangement, but the load factor of the electric motor 12 may be controlled based on a temperature of a component that constitutes the power transmission system 16, which temperature varies in association with the temperature Tm of the electric motor 12, for example.

Here, effects of the present disclosure will be described. The control system of the first aspect of the disclosure includes the electronic control unit that limits the load factor of the electric motor, in the case where the temperature of the electric motor is higher than the first threshold temperature for use in the automatic driving mode when the vehicle travels in the automatic driving mode, and the case where the temperature of the electric motor is higher than the second threshold temperature for use in the manual driving mode when the vehicle travels in the manual driving mode. The electronic control unit sets the second threshold temperature to a value higher than the first threshold temperature. Thus, the load factor of the electric motor is not limited during manual driving, even at temperatures at which the load factor would be limited by the electronic control unit during automatic driving. Therefore, when the vehicle is switched from the automatic driving mode to the manual driving mode in a condition where the load factor of the electric motor is limited, drive torque requested by the driver is delivered from the electric motor with no limitations placed on the output torque of the electric motor, and otherwise possible reduction of the response of the vehicle can be curbed.

The control system of the second aspect of the disclosure, the electronic control unit limits the load factor of the electric motor, when the hydraulic oil temperature of the hydraulic oil supplied to the hydraulically operated parts and lubrication regions is higher than the first threshold temperature during automatic driving, and when the hydraulic oil temperature is higher than the second threshold temperature during manual driving. The electronic control unit sets the second threshold temperature to a value higher than the first threshold temperature. The hydraulically operated parts and lubrication regions are included in power transmission system provided on the power transmission path between the electric motor and the drive wheels. Thus, the electronic control unit can limit the load factor of the electric motor, based on the hydraulic oil temperature as well as the temperature of the electric motor, so that the electric motor can be controlled based on more appropriate conditions.

The control system of the third aspect of the disclosure, the electric motor is connected to the power storage device via the inverter. The electronic control unit limits the load factor of the electric motor when the temperature of the inverter is higher than the first threshold temperature during automatic driving, and when the temperature of the inverter is higher than the second threshold temperature during manual driving. The electronic control unit sets the second threshold temperature to a value higher than the first threshold temperature. Thus, the electronic control unit can limit the load factor of the electric motor, based on the temperature of the inverter as well as the temperature of the electric motor, so that the electric motor can be controlled based on more appropriate conditions.

In any one of the control system of first to third aspect of the disclosure, the electronic control unit sets the second threshold temperature to a value equal to the first threshold temperature, after a predetermined time elapses from the time when the vehicle is switched from the automatic driving mode to the manual driving mode. It is thus possible to curb reduction of the response of the vehicle, which would occur when the output torque of the electric motor is limited by the electronic control unit, and is also possible to curb increase in the temperature of the electric motor.

In any one of the control system described above, when the second automatic driving mode having a higher degree of freedom in traveling than the automatic driving mode is selected, the electronic control unit sets the first threshold temperature so as to reduce a threshold temperature difference between the second threshold temperature and the first threshold temperature. Thus, since the first threshold temperature of the second automatic driving mode is set to be higher than the first threshold temperature of the automatic driving mode, the load factor of the electric motor is less likely or unlikely to be limited in the second automatic driving mode. Therefore, in the second automatic driving mode, the degree of freedom in traveling can be increased to be higher than that of the automatic driving mode. Also, when the vehicle is switched from the manual driving mode to the second automatic driving mode, for example, the load factor of the electric motor can be made less likely or unlikely to be limited by the electronic control unit.

An abstract of the present disclosure will be described as follows. A control system of a vehicle 10 includes an electronic control unit 70. The electronic control unit 70 limits the load factor of an electric motor 12 when the temperature of the electric motor Tm during automatic driving is higher than a first threshold temperature Tm1 for use in an automatic driving mode, and when the temperature of the electric motor Tm during manual driving is higher than a second threshold temperature Tm2 for use in a manual driving mode. The second threshold temperature Tm2 is set to be a value higher than the first threshold temperature Tm1. Thus, since the load factor is not limited during manual driving, at temperatures at which the load factor would be limited during automatic driving, drive torque requested by the driver is delivered with no limitations placed on output torque of the electric motor 12 when the vehicle 10 is switched from automatic driving to manual driving.

While the embodiments of the disclosure have been described in detail based on the drawings, the above-described embodiments are merely exemplary and the disclosure may be embodied with various modifications or improvements added based on the knowledge of those skilled in the art, without departing from the principle of the disclosure, though each of the modifications and improvements will not be described herein.

What is claimed is:

1. A control system installed on a vehicle having an electric motor as a drive power source, comprising:
an electronic control unit configured to:
switch the vehicle between an automatic driving mode using automatic drive control, and a manual driving mode in which the vehicle is operated by a driver; and
limit a load factor of the electric motor, in a case where a temperature of the electric motor is higher than a first threshold temperature when the vehicle travels in the automatic driving mode, and a case where the temperature of the electric motor is higher than a second threshold temperature when the vehicle travels in the manual driving mode, the second threshold temperature being set to a value that is higher than the first threshold temperature.

2. The control system according to claim 1, wherein the electronic control unit is configured to set the second threshold temperature to a value equal to the first threshold temperature, after a lapse of a predetermined time from a point in time at which the vehicle is switched from the automatic driving mode to the manual driving mode.

3. The control system according to claim 1, wherein the electronic control unit is configured to set the first threshold temperature so as to reduce a threshold temperature difference between the second threshold temperature and the first threshold temperature, when a second automatic driving mode having a higher degree of freedom in traveling than the automatic driving mode is selected.

4. A control system installed on a vehicle having an electric motor as a drive power source, the vehicle includes a power transmission system provided on a power transmission path between the electric motor and drive wheels, the control system comprising:
an electronic control unit configured to:
switch the vehicle between an automatic driving mode using automatic drive control, and a manual driving mode in which the vehicle is operated by a driver; and
limit a load factor of the electric motor, in a case where a hydraulic oil temperature is higher than a first threshold temperature when the vehicle travels in the automatic driving mode, and a case where the hydraulic oil temperature is higher than a second threshold temperature when the vehicle travels in the manual driving mode, the second threshold temperature being set to a value that is higher than the first threshold temperature, the hydraulic oil temperature being a temperature of hydraulic oil supplied to hydraulically operated parts and lubrication regions, and the hydraulically operated parts and the lubrication regions being included in the power transmission system.

5. The control system according to claim 4, wherein the electronic control unit is configured to set the second threshold temperature to a value equal to the first threshold temperature, after a lapse of a predetermined time from a point in time at which the vehicle is switched from the automatic driving mode to the manual driving mode.

6. The control system according to claim 4, wherein the electronic control unit is configured to set the first threshold temperature so as to reduce a threshold temperature difference between the second threshold temperature and the first threshold temperature, when a second automatic driving mode having a higher degree of freedom in traveling than the automatic driving mode is selected.

7. A control system installed on a vehicle having an electric motor as a drive power source, the vehicle includes an inverter and a power storage device, the electric motor is connected to the power storage device via the inverter, the control system comprising:
 an electronic control unit configured to:
  switch the vehicle between an automatic driving mode using automatic drive control, and a manual driving mode in which the vehicle is operated by a driver; and
  limit a load factor of the electric motor, in a case where a temperature of the inverter is higher than a first threshold temperature when the vehicle travels in the automatic driving mode, and a case where the temperature of the inverter is higher than a second threshold temperature when the vehicle travels in the manual driving mode, the second threshold temperature being set to a value that is higher than the first threshold temperature.

8. The control system according to claim 7, wherein
 the electronic control unit is configured to set the second threshold temperature to a value equal to the first threshold temperature, after a lapse of a predetermined time from a point in time at which the vehicle is switched from the automatic driving mode to the manual driving mode.

9. The control system according to claim 7, wherein
 the electronic control unit is configured to set the first threshold temperature so as to reduce a threshold temperature difference between the second threshold temperature and the first threshold temperature, when a second automatic driving mode having a higher degree of freedom in traveling than the automatic driving mode is selected.

* * * * *